(12) United States Patent
Huh et al.

(10) Patent No.: US 10,256,762 B2
(45) Date of Patent: Apr. 9, 2019

(54) SYSTEMS AND METHODS FOR ACTIVE DAMPING OF A MOTOR

(71) Applicant: General Electric Company, Schenectady, NY (US)

(72) Inventors: Kum Kang Huh, Schenectady, NY (US); Di Pan, Schenectady, NY (US); David Allan Torrey, Ballston Spa, NY (US); Nathaniel Benedict Hawes, Ballston Spa, NY (US); Tomas Sadilek, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/634,723

(22) Filed: Jun. 27, 2017

(65) Prior Publication Data

US 2018/0375456 A1 Dec. 27, 2018

(51) Int. Cl.
| | | |
|---|---|---|
| H02K 19/12 | (2006.01) | |
| H02P 23/14 | (2006.01) | |
| H02P 27/06 | (2006.01) | |
| E21B 43/12 | (2006.01) | |
| F04D 13/08 | (2006.01) | |
| F04D 15/00 | (2006.01) | |

(52) U.S. Cl.
CPC ............ *H02P 23/14* (2013.01); *E21B 43/128* (2013.01); *H02P 27/06* (2013.01); *F04D 13/086* (2013.01); *F04D 15/0066* (2013.01)

(58) Field of Classification Search
CPC ............ H02P 23/14; H02P 23/18; H02M 5/14
See application file for complete search history.

(56) References Cited

U.S. PATENT DOCUMENTS

| | | |
|---|---|---|
| 2,154,289 A | 4/1939 | Shutt |
| 4,330,740 A | 5/1982 | Shell et al. |

(Continued)

FOREIGN PATENT DOCUMENTS

| | | |
|---|---|---|
| DE | 3632645 A1 | 3/1988 |
| WO | 2014209127 A1 | 12/2014 |
| WO | 2015164681 A1 | 10/2015 |

OTHER PUBLICATIONS

Ernst, Tom; "Application of multi-function motor protection relays to variable frequency drive connected motors", Protective Relay Engineers, 2014 67th Annual Conference for, pp. 279-291, Mar. 31-Apr. 3, 2014, College Station, TX.

(Continued)

*Primary Examiner* — Karen Masih
(74) *Attorney, Agent, or Firm* — GE Global Patent Operation (57) ABSTRACT

A method includes controlling a first power output to an electric machine during a transient event. Controlling the first power output includes measuring values of the first power output provided to the electric machine during the transient event, receiving an estimated speed input of the electric machine, determining adjustment commands to compensate the first power output for the transient event of the electric machine, generating switch commands for gate drives of a variable frequency drive (VFD) based at least in part on the adjustment commands, and modifying the first power output during the transient event based on the switch commands.

20 Claims, 6 Drawing Sheets

(56) References Cited

U.S. PATENT DOCUMENTS

| | | | |
|---|---|---|---|
| 6,043,995 | A | 3/2000 | Leuthen |
| 6,264,431 | B1 | 7/2001 | Triezenberg |
| 6,388,353 | B1 | 5/2002 | Liu et al. |
| 6,531,842 | B2 | 3/2003 | Ledoux et al. |
| 6,850,021 | B1 | 2/2005 | Golownia et al. |
| 6,940,249 | B2 | 9/2005 | Toyoda |
| 7,170,262 | B2 | 1/2007 | Pettigrew |
| 7,202,619 | B1 | 4/2007 | Fisher |
| 7,971,650 | B2 | 7/2011 | Yuratich et al. |
| 8,344,673 | B2 | 1/2013 | Rotondo et al. |
| 8,456,116 | B2 | 6/2013 | Burdick |
| 8,624,530 | B2 | 1/2014 | Chung et al. |
| 9,054,611 | B2 | 6/2015 | Liu et al. |
| 9,054,615 | B2 | 6/2015 | Head et al. |
| 9,595,903 | B2 | 3/2017 | Hawes et al. |
| 2001/0032721 | A1 | 10/2001 | Rider et al. |
| 2008/0187444 | A1 | 8/2008 | Molotkov et al. |
| 2013/0235494 | A1 | 9/2013 | Holce et al. |
| 2014/0009102 | A1* | 1/2014 | Lu .................. G01P 3/48 318/808 |
| 2016/0032698 | A1 | 2/2016 | Bogachuk et al. |
| 2017/0126077 | A1 | 5/2017 | Torrey et al. |
| 2017/0146015 | A1 | 5/2017 | Hawes et al. |
| 2018/0094512 | A1 | 4/2018 | Sadilek et al. |
| 2018/0097466 | A1 | 4/2018 | Huh et al. |
| 2018/0241332 | A1* | 8/2018 | Ottewill .......... H02P 21/16 |
| 2018/0248500 | A1 | 8/2018 | Hawes et al. |

OTHER PUBLICATIONS

International Search Report & Written Opinion issued in connection with corresponding PCT Application No. PCT/US2018/035175 dated Sept. 13, 2018.

\* cited by examiner

SYSTEMS AND METHODS FOR ACTIVE DAMPING OF A MOTOR

BACKGROUND

The subject matter disclosed herein relates to variable frequency drives (VFDs) for driving electric machines, and more specifically to systems and methods for active damping of a motor used with electric submersible pumps (ESPs) in oil and gas applications.

In typical oil and gas drilling applications a well bore is drilled to reach a reservoir. The well bore may include multiple changes in direction and may have sections that are vertical, slanted, or horizontal. A well bore casing is inserted into the well bore to provide structure and support for the well bore. The oil, gas, or other fluid deposit is then pumped out of the reservoir, through the well bore casing, and to the surface, where it is collected. One way to pump the fluid from the reservoir to the surface is with an electrical submersible pump (ESP), which is driven by an electric motor (e.g., induction motor or a permanent magnet motor) in the well bore casing.

A variety of components may be used to receive power from a power source, filter, convert and/or transform the power, and then drive the electric motor. For example, a variable frequency drive (VFD) may receive power from a power source (e.g., utility grid, batteries, a generator, etc.). The power may then pass through a filter and a step up transformer to generate a stepped up voltage, and the stepped up voltage may be provided to the electric motor via a cable that passes through the well bore. As noted above, the electric motor may be an induction motor or a permanent magnet motor, and may be utilized within the well bore casing to drive the ESP. In some situations, it may be desirable to utilize a permanent magnet motor instead of an induction motor. However, it may be difficult to control and drive a permanent magnet motor in an efficient and stable manner.

BRIEF DESCRIPTION

Certain embodiments commensurate in scope with the original claims are summarized below. These embodiments are not intended to limit the scope of the claims, but rather these embodiments are intended only to provide a brief summary of possible forms of the claimed subject matter. Indeed, the claims may encompass a variety of forms that may be similar to or different from the embodiments set forth below.

In one embodiment, a system includes a control system configured to control a first power output to an electric machine during a transient event. The transient event includes a torque change of the electric machine greater than a torque threshold over a threshold period or a speed change of the electric machine greater than a speed threshold over the threshold period. The control system includes a controller and a modulator. The controller is configured to receive estimated speed input and measured values of the first power output provided to the electric machine during the transient event, and the controller is configured to determine adjustment commands to compensate the first power output for the transient event of the electric machine. The adjustment commands are based on the estimated speed input and measured values of the first power output during the transient event. The modulator is configured to generate switch commands for gate drives of a variable frequency drive (VFD) based at least in part on the adjustment commands. The VFD is configured to modify the first power output during the transient event based on the switch commands.

In another embodiment, a method includes controlling a first power output to an electric machine during a transient event. Controlling the first power output includes measuring values of the first power output provided to the electric machine during the transient event, receiving an estimated speed input of the electric machine, determining adjustment commands to compensate the first power output for the transient event of the electric machine, generating switch commands for gate drives of a variable frequency drive (VFD) based at least in part on the adjustment commands, and modifying the first power output during the transient event based on the switch commands.

In another embodiment, a control system includes a primary variable frequency drive (VFD) and synchronization circuitry. The primary VFD is configured to receive power from a power source and to output a variable voltage and variable amplitude AC signal to a transformer configured to output a stepped up AC signal to a permanent magnet motor. The synchronization circuitry is disposed between the transformer and the permanent magnet motor and configured to receive the stepped up AC signal from the transformer. The synchronization circuitry includes one or more sensors configured to measure the current and the voltage of the stepped up AC signal, and a controller coupled to the one or more sensors. The controller is configured to determine a power of the stepped up AC signal from the measured current and the measured voltage during a transient event of the permanent magnet motor, determine torque changes during the transient event from an estimated speed of the permanent magnet motor and the power of the stepped up AC signal, determine adjustment commands to adjust the stepped up AC signal based at least in part on a first compensator output of a proportional compensator applied to the torque changes, and control a supplemental AC signal from a secondary VFD based at least in part on the adjustment commands. The supplemental AC signal is added to the stepped up AC signal and is configured to stabilize operation of the permanent magnet motor during the transient event.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Embodiments of the present disclosure relate to systems and methods for controlling an electric machine (e.g., permanent magnet motor) that is used to drive electric submersible pumps (ESPs) within oil and gas applications. As noted above, voltage from a power source may pass through a variable frequency drive (VFD), a filter, and a step up transformer, and the stepped up voltage may be provided to an electric motor via a cable that passes through a well bore. The electric motor may be utilized to drive the ESP to pump fluid from a reservoir to the surface, where it is collected. For example, in certain situations, the electric motor may be an induction motor (e.g., asynchronous motor) and voltage may be applied to the induction motor to generate torque (e.g., power) for driving the ESP. In other situations, a permanent magnet motor (e.g., synchronous) may be utilized instead of an induction motor. For example, permanent magnet motors (PMNs) may be configured to provide a greater power density (e.g., power per unit length of the motor, power per unit weight of the motor, power per unit volume of the motor) than induction motors. However, controlling and driving a PMM with systems configured to control and drive an induction motor may lead to instability and inefficiency within the system. Accordingly, certain embodiments of the present disclosure relate to systems and methods for controlling permanent magnet motors that are configured to drive electric submersible pumps (ESPs) within oil and gas applications. Systems and methods described herein may increase the operational stability of ESPs driven with permanent magnet motors.

The present embodiments relate to controlling a permanent magnet motor (e.g., synchronous motor) in an effective manner, while improving the overall system stability. Specifically, the present embodiments are related to controlling a permanent magnet such that the rotation of the shaft of the motor is synchronized with the frequency of the supplied current in order to produce average torque (e.g., power). Indeed, in certain situations, it may not be efficient to excite a synchronous motor (e.g., permanent magnet motor) with a controller configured for an asynchronous motor (e.g., induction motor), at least in part because the controller may not be able to maintain a robust control of the overall system performance (e.g., torque produced by motor). For example, in a situation where the ESP recovers from a gas lock, the rotation of the shaft of the permanent magnet motor may become out of sync with frequency of current supplied to the permanent magnet motor. Accordingly, it may be beneficial to provide a controller configured to control the permanent magnet motor in a robust manner, such that the permanent magnet motor responds to disturbances (e.g., changes in load, changes in speed, etc.) of a transient event efficiently to maintain overall stability within the system.

It may be appreciated that an induction motor may self-adjust in response to transient events (e.g., step changes) in the load on the induction motor. That is, when the load on the induction motor suddenly decreases, the induction motor may self-adjust to stable operation by increasing the speed and decreasing the torque output. Also, when the load on the induction motor suddenly increases, the induction motor may self-adjust to stable operation by decreasing the speed and increasing the torque output. In contrast, an uncompensated permanent magnet motor may decrease the speed and the torque output in response to a transient event (e.g., sudden increase) in the load, thereby destabilizing the uncompensated permanent magnet motor. Also, an uncompensated permanent magnet motor may increase the speed and the torque output in response to a transient event (e.g., sudden decrease) in the load, thereby destabilizing the uncompensated permanent magnet motor.

Accordingly, embodiments of the present disclosure relate to increasing the stability of a permanent magnet motor of an ESP during a transient event without incorporating physical components (e.g., additional rotor windings, damper winding system, etc.) to the permanent magnet motor. For example, some embodiments of the present disclosure include a virtual damper system implemented by a controller of the system. The virtual damper system may be configured to adjust the torque output and the speed of the permanent magnet motor in response to a transient event of the permanent magnet motor. As discussed herein, a transient event may include a torque change between the unloaded to the rated load condition over a threshold period on the order of 0.5 to 2.0 seconds, a speed change of between zero speed to rated speed over a threshold period on the order of 1 to 10 seconds, or any combination thereof. In some embodiments, the threshold period may be less than 3.0, 1.0, or 0.5 second. That is, the virtual damper system may damp out oscillations that may be caused by disturbances (e.g., changes in load, changes in speed) on the rotor of the permanent magnet motor. Indeed, the virtual damper system may be configured to improve control of the permanent magnet motor, thereby mitigating torque pulsations which may cause damage to components of the ESP (e.g., shaft, seal, bearings, etc.). Further, the virtual damper system may be configured to mitigate spikes in voltage and/or current to the permanent magnet motor, thereby maintaining or improving stability within the system, and mitigating damage to physical components of the system (e.g., permanent magnets, motor windings, cable, surface electrical equipment). Furthermore, the virtual damper system may be configured to improve the robustness of the control of the permanent magnet motor, thereby decreasing overall downtime of the permanent magnet motor and improving well production. In some embodiments, the virtual damper system enables the permanent magnet motor of an ESP assembly without a damper cage to respond to load changes or speed changes as though the ESP assembly included a damper cage around the permanent magnet motor.

Figure 1:
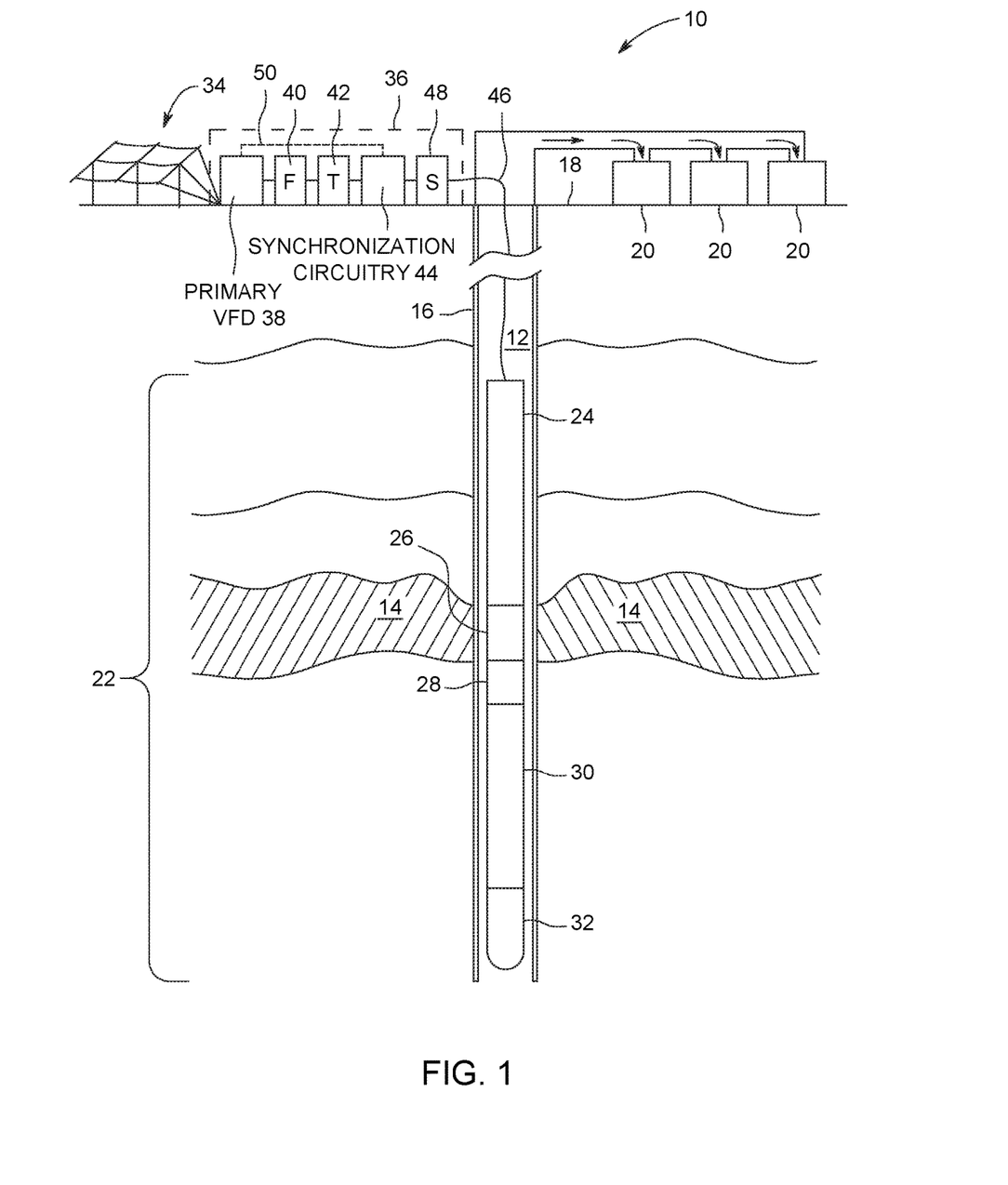
FIG. 1 is a schematic of a hydrocarbon extraction system extracting fluid from an underground reservoir in accordance with aspects of the present disclosure.

With the foregoing in mind, FIG. 1 is a schematic of a hydrocarbon extraction system (e.g., well 10) extracting fluid deposits (e.g., oil, gas, etc.) from an underground reservoir 14. As shown in FIG. 1, a well bore 12 may be drilled in the ground toward a fluid reservoir 14. Though the well bore 12 shown in FIG. 1 is a vertical well bore 12, well bores 12 may include several changes in direction and may include slanted or horizontal sections. A well bore casing 16 is typically inserted into the well bore 12 to provide support. Fluid deposits from the reservoir 14, may then be pumped to the surface 18 for collection in tanks 20, separation, and refining. Though there are many possible ways to pump fluids from an underground reservoir 14 to the surface 18, one technique is to use an electrical submersible pump (ESP), as shown in FIG. 1.

When using an ESP, an ESP assembly or system 22 is fed through the well bore casing 16 toward the reservoir 14. The ESP assembly 22 may include a pump 24, an intake 26, a sealing assembly 28, an electric motor 30 (e.g., permanent magnet motor), and a sensor 32. Power may be drawn from a power source 34 and provided to the PMM 30 by an ESP control system 36. The power source 34 shown in FIG. 1 is a utility grid, but power may be provided in other ways (e.g., generator, batteries, etc.). The ESP control system 36 may include a primary variable frequency drive (VFD) 38, a filter 40, a transformer 42, synchronization circuitry 44, and a cable 46. In some embodiments, one or more sensors 48 are coupled to the cable 46 to measure one or more electrical properties (e.g., voltage, current, inductance, capacitance, impedance) of the variable frequency power signal on the cable 46. It should be understood, however, that FIG. 1 shows one embodiment, and that other embodiments may omit some elements or have additional elements. The primary VFD 38 receives power from the power source 34 and synthesizes the variable frequency, variable amplitude, AC voltage that drives the motor. In some embodiments, the power output by the primary VFD 38 may be filtered by filter 40 (e.g., sine wave filter, a low pass filter, a band pass filter). The voltage may then be stepped up or down by a transformer 42. In the present embodiment, a step up transformer is used for efficient transmission down the well bore 12 to the ESP assembly 22, however, other transformers or a plurality of transformers may be used. The ESP control system 36 provides power to the motor 30 via the cable 46 to drive the pump 24.

The PMM 30 may more efficiently convert the power from the cable 46 to mechanical energy when a rotor position of the PMM 30 is synchronized with the phase angle of the current provided to the stator of the PMM 30. As discussed in detail below, the synchronization circuitry 44 may directly adjust the phase angle of the current provided via the cable 46 to the PMM 30 or indirectly adjust the phase angle of the current provided via the cable through control of the primary VFD 38. In some embodiments, the synchronization circuitry 44 includes a secondary VFD disposed on the high-voltage side of the transformer 42 and configured to deliver full-rated current for a short period of time (e.g., one minute or less) when the PMM 30 draws more power than the transformer 42 can support for the short period of time. In embodiments with multiple transformers (e.g., a step up transformer 42 at the surface, and a step down transformer in the well bore 12, at the end of the cable 46), the secondary VFD of the synchronization circuitry 44 may be installed between the transformers or at the termination of the second transformer.

In some embodiments, the synchronization circuitry 44 includes a controller configured to provide adjustment signals to the primary VFD 38 via a transmission link 50 to adjust the power output provided by the primary VFD 38 to the transformer 42. As discussed herein, the controller that provides adjustment signals to the primary VFD 38 may be configured as a "virtual encoder" for the primary VFD 38. Suitable transmission links 50 may include wired or wireless connections, and the adjustment signals may be analog adjustment signals or digital adjustment signals.

A variable frequency power output is provided to the ESP assembly 22 via the cable 46 that is fed through the well bore casing 16 from the surface 18 to the ESP assembly 22. The pump 24 may be a centrifugal pump with one or more stages. The intake 26 acts as a suction manifold, through which fluids 14 enter before proceeding to the pump 24. In some embodiments, the intake 26 may include a gas separator. A sealing assembly 28 may be disposed between the intake 26 and the PMM 30. The sealing assembly protects the PMM 30 from well fluids 14, transmits torque from the PMM 30 to the pump 24, absorbs shaft thrust, and equalizes the pressure between the reservoir 14 and the PMM 30. Additionally, the sealing assembly 28 may provide a chamber for the expansion and contraction of the motor oil resulting from the heating and cooling of the PMM 30 during operation. The sealing assembly 28 may include labyrinth chambers, bag chambers, mechanical seals, or some combination thereof.

The sensor 32 is typically disposed at the base of the ESP assembly 22 and collects real-time system and well bore parameters. Sensed parameters may include pressure, temperature, motor winding temperature, vibration, current leakage, discharge pressure, and so forth. The sensor 32 may provide feedback to the ESP control system 36 and alert users when one or more sensed parameters fall outside of expected ranges.

Figure 2:
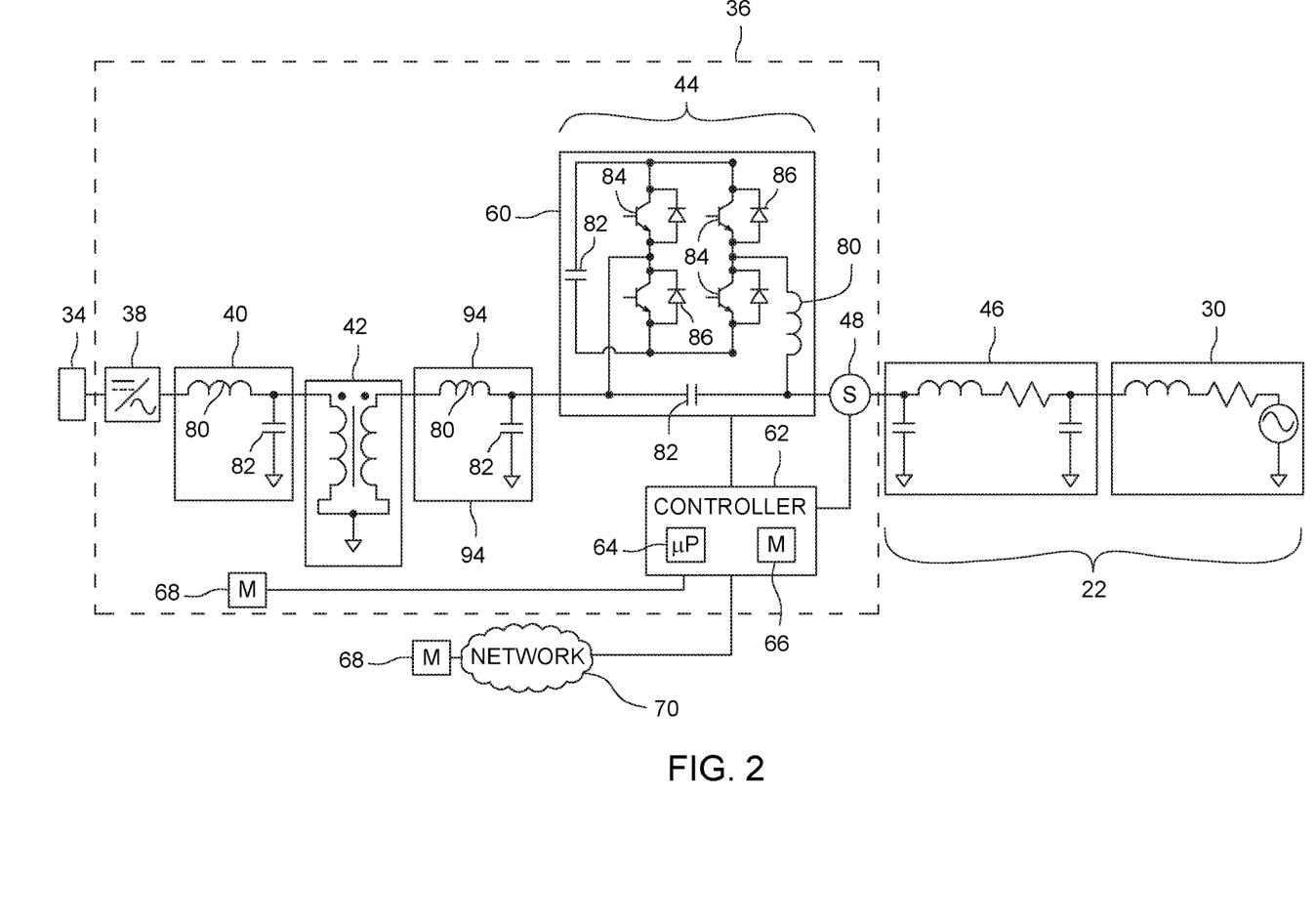
FIG. 2 is a wiring schematic of the electric submersible pump (ESP) control system in accordance with aspects of the present disclosure, where the wiring schematic includes a secondary variable frequency drive (VFD)

FIG. 2 is a wiring schematic of an embodiment of the ESP control system 36 shown in FIG. 1, where the synchronization circuitry 44 includes a secondary VFD 60. In some embodiments, the secondary VFD 60 is coupled to a controller 62 configured to control the output of the secondary VFD 60 to the cable 46. The controller 62 may include a processor 64 configured to execute instructions from a memory 66 (e.g., a non-transitory, computer readable media). The instructions may include instructions to control the synchronization circuitry 44 as a virtual damper that measures electrical signals in the ESP control system and injects electrical signals (e.g., current, voltage) to provide electrical damping. For example, the synchronization circuitry 44 controlled as a virtual damper may simulate the effect on the power output of a damper cage disposed about the PMM 30, thereby increasing the operational stability of the PMM 30. As previously discussed, the primary VFD 38 receives power from a power source 34 (e.g., utility grid, battery, generator, etc.), modifies the power, and outputs a power signal of the desired frequency and amplitude for driving the PMM 30. The primary VFD 38 may include power electronic switches, current measurement components, voltage measurements components, a process, or other components. The primary VFD 38 is disposed on the primary side (e.g., low voltage side) of the transformer 42 and is programmed to operate the PMM 30.

The output from the primary VFD 38 may then be filtered using the filter 40. In the embodiment shown, the filter 40 is a sine wave filter, however in other embodiments, the filter may be any low pass filter, band pass filter, or any other kind of filter. As shown in FIG. 2, the filter 40 may include inductors 80, capacitors 82, or other electrical components. The output voltage from the filter 40 is stepped up using the step up transformer 42. The step up transformer 42 steps up the voltage of the power signal for efficient transmission through the cable 46 to the PMM 30, which in some applications may as long as 1,000 to 10,000 feet. Magnetic saturation of the transformer 42 for some loading conditions (e.g., startup of a synchronous motor, seizure of the pump, transient load conditions, etc.) with a low frequency and a high torque may prevent the primary VFD 38 and the transformer 42 alone from providing sufficient voltage or magnetic flux to keep the PMM 30 from stalling.

In order to deal with the magnetic saturation of the transformer 42, the synchronization circuitry 44 may include the secondary VFD 60 on the high voltage secondary side of the transformer 42. The secondary VFD 60 may be disposed in series or parallel with the cable 46. Electrical power from the transformer 42 may be stored in the secondary VFD 60, thereby enabling the secondary VFD 60 to deliver full rated current for short periods of time (e.g., less than 1 minute), thus supplementing the voltage of the primary VFD 38 until the PMM 30 reaches a high enough frequency for the primary VFD 38 to drive the PMM 30 on its own. As previously discussed, the power signal output by the ESP control system 36 is transmitted to the PMM 30 via the cable 46.

The secondary VFD 60 may interface with only one or all three phases of the system 36. As shown in FIG. 2, the secondary VFD 60 may include transistors 84 (e.g., IGBT or MOSFET), diodes 86, inductors 80, capacitors 82, and any number of other components. The synchronization circuitry 44 may also include power electronic switches, one or more sensors 48 to measure electrical properties on the cable 46 (e.g., current, voltage, impedance, capacitance, inductance), the controller 62 coupled to the one or more sensors 48, the processor 64, the memory 66, and the like. As discussed in detail below, controller 62 may execute algorithms that control characteristics of the power output to the PMM 30 to simulate a damper. When simulating the damper, the controller 62 may adjust the frequency of the power supplied to the PMM 30, the voltage supplied to the PMM 30, the current supplied to the PMM 30, or the desired angle of the PMM 30, or any combination thereof. The controller 62 may control the characteristics of the power output directly through control of the primary VFD 38, indirectly through modulation of the power output through control of the secondary VFD 60, or any combination thereof. In some embodiments, the secondary VFD 60 strengthens the power output provided by the primary VFD 38, adds signals to the power output provided by the primary VFD 38, attenuates the power output provided by the primary VFD 38, or removes signals from the power output provided by the primary VFD 38, or any combination thereof.

The algorithms executed by the controller 62 may compare feedback provided by the one or more sensors 48 to data stored in a data storage device 68. The data stored in the data storage device 68 may include reference data, one or more thresholds, a lookup table, data from the coupled hydrocarbon extraction system 10, or data from other hydrocarbon extraction systems 10, or any combination thereof. The data storage device 68 may be the memory 66 of the controller 62, a memory of the ESP control system 36, or a memory coupled to the controller 62 via a network 70. In some embodiments, the network 70 may include, but is not limited to, the Internet, a Local Area Network (LAN), a Wide Area Network (WAN), or a virtual private network.

In some embodiments, the synchronization circuitry 44 may include a filter 94 (e.g., band stop filter, low pass filter, high pass filter) disposed between the secondary VFD 60 and the transformer 42 to reduce or eliminate signals from the secondary VFD 60 from passing through the transformer towards the primary VFD 38 or the power source 34. That is, the filter 94 may be directly coupled to the transformer 42. Furthermore, in addition to the single phase H-bridge topology shown in FIG. 2, the secondary VFD 60 may have a single phase half-bridge topology, or a polyphase half-bridge topology. In addition to the series topology, a parallel topology may be employed to couple the secondary VFD 60 to the output of the transformer 42.

Figure 3:
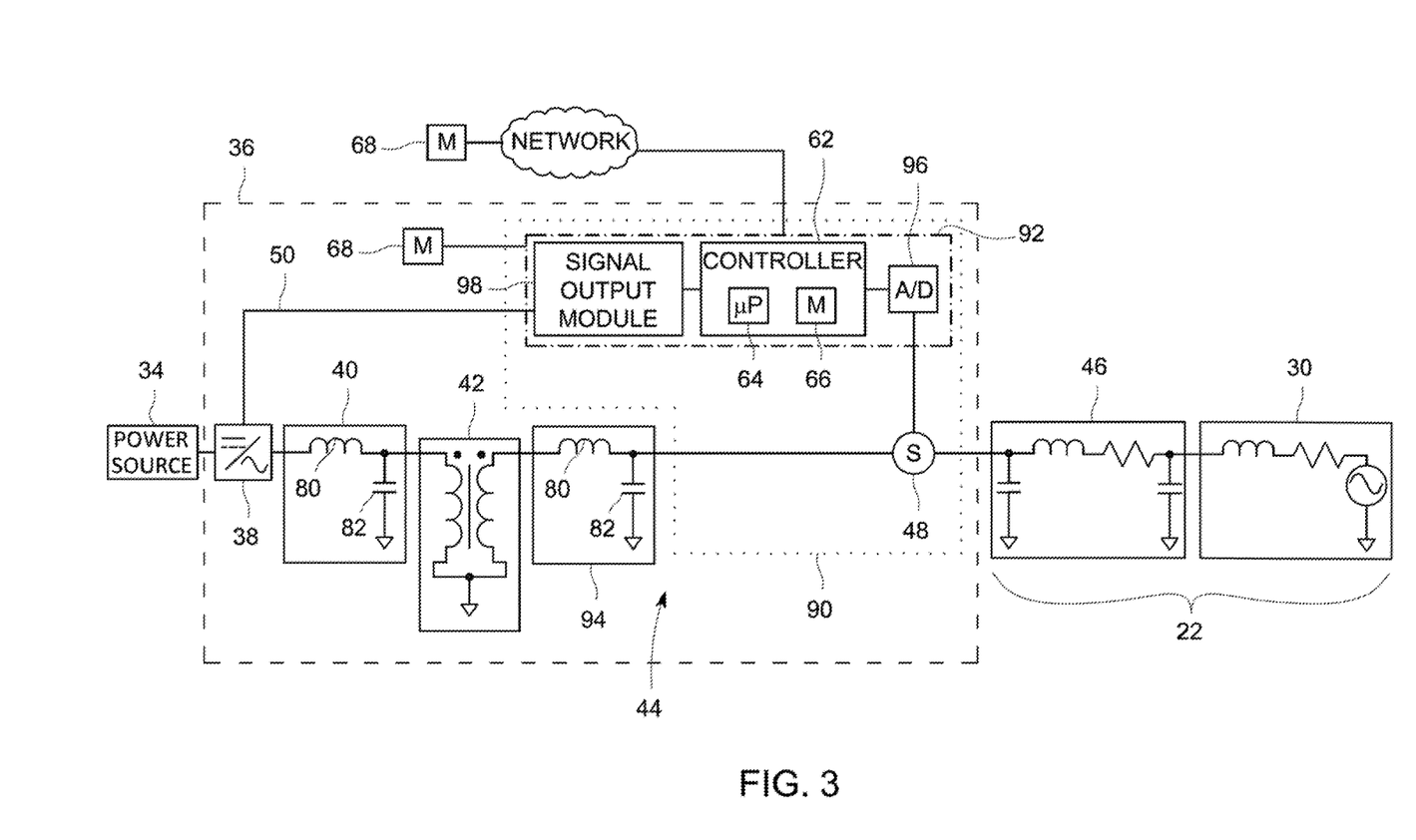
FIG. 3 is a wiring schematic of the electric submersible pump (ESP) control system in accordance with aspects of the present disclosure, where the wiring schematic includes a controller acting as a virtual encoder.

FIG. 3 is a wiring schematic of an embodiment of the ESP control system 36 shown in FIG. 1, where the synchronization circuitry 44 includes a virtual encoder 90. As previously discussed, the primary VFD 38 receives power from a power source 34 (e.g., utility grid, battery, generator, etc.), modifies the power, and outputs a power signal of the desired frequency and amplitude for driving the PMM 30. The primary VFD 38 may include power electronic switches, current measurement components, voltage measurements components, a process, or other components. The primary VFD 38 is disposed on the primary side of the transformer 42 and is programmed to operate the PMM 30.

One or more sensors 48 of the virtual encoder 90 of the synchronization circuitry 44 may measure electrical properties on the cable 46 (e.g., current, voltage, impedance, capacitance, inductance, back-electromotive force). The one or more sensors 48 may provide feedback to a digital signal processor 92, which correlates the feedback with a rotor position of the PMM 30. The digital signal processor 92 may transmit signals corresponding to the rotor position to the primary VFD 38 via the transmission link 50. The signals transmitted to the primary VFD 38 may adjust one or more properties of the output of the primary VFD 38 including, but not limited to the frequency, the angle, the current, or the voltage, or any combination thereof. The primary VFD 38 may be configured to respond to signals from the digital signal processor 92 as though the signals were from a closed-loop position sensor in the PMM 30 itself. The filter 94 (e.g., low pass filter, high pass filter, bandstop filter) may reduce or eliminate signals from virtual encoder 90 from passing through the transformer 42 towards the primary VFD 38 or the power source 34.

The feedback from the one or more sensors 48 may be received by an analog to digital converter 96, which converts the feedback to a digital signal to be received by the controller 62. The controller 62 may have the processor 64 configured to execute instructions stored in a memory 66. The memory 66 may be a non-transitory computer readable medium that may store instructions (e.g., code, software) for implementing an algorithm, such as an algorithm to determine the rotor position of the PMM 30 from the feedback of the one or more sensors 48, to control the signal provided to the primary VFD 38 via the transmission link 50. As discussed in detail below, the controller 62 may execute algorithms that control characteristics of the power output to the PMM 30 to simulate a damper. When simulating the damper, the controller 62 may adjust the frequency of the power supplied to the PMM 30, the voltage supplied to the PMM 30, the current supplied to the PMM 30, or the desired angle of the PMM 30, or any combination thereof. The controller 62 may control the characteristics of the power output directly through control of the primary VFD 38, indirectly through modulation of the power output through control of the secondary VFD 60, or any combination thereof.

A signal output module 98 coupled to the controller 62 may provide one or more output signals to the primary VFD 38 via the transmission link 50. The output signals may be sinusoidal output signals, quadrature output signals, or digital output signals, or any combination thereof. The sinusoidal and quadrature output signals may contain rotor position data determined by the controller 62, which may be processed directly by the primary VFD 38 and trigger the appropriate control responses. Similarly, digital output signals may include rotor position format in a digitized format or VFD drive commands in digital format, as when the controller 62 functions as a master controller for the primary VFD 38 to control the power output to the PMM 30. As discussed in detail below with FIGS. 4 and 6, the output signals from the virtual encoder via the transmission link 50 may include adjustment commands configured to compensate the power output for the transient event of the PMM 30.

As discussed above with FIGS. 2 and 3, the synchronization circuitry 44 may adjust the phase angle of the current provided via the cable 46 to the PMM 30. The synchronization circuitry may directly adjust the phase angle by control of the secondary VFD 60, or the synchronization circuitry 44 may indirectly adjust the phase angle through control of the primary VFD 38 with the virtual encoder 90. As discussed herein, a dual drive system refers to embodiments of the ESP control system 36 with the primary VFD 38 and the secondary VFD 60. The dual drive system may utilize the secondary VFD 60 to supplement the primary VFD 38, for example, as described in U.S. patent application Ser. No. 14/946,513 entitled "Dual Motor Drive For Electric Submersible Pump Systems", filed Nov. 19, 2015, which is incorporated by reference in its entirety for all purposes. Moreover, as discussed herein, a virtual encoder system refers to embodiments of the ESP control system 36 with the virtual encoder 90 without the secondary VFD 60. The virtual encoder system may utilize the virtual encoder 90 to monitor the power provided to the PMM 30 via the cable 46, to determine a rotor angle of the PMM 30, and to control the primary VFD 38, for example, as described in U.S. Pat. No. 9,595,903 entitled "Controller For Motor", filed Mar. 20, 2015, which is incorporated by reference in its entirety for all purposes. As discussed in detail below, the synchronization circuitry 44 may utilize feedback from the one or more sensors 48 of the synchronization circuitry 44 for more than adjustment of the phase angle of the current provided by the cable 46 to the PMM 30.

In some embodiments, the controller 62 of the synchronization circuitry 44 may determine the rotor angle of the PMM 30 from feedback of the one or more sensors 48 based at least in part on a determined motor back-emf voltage. For example, the controller 62 may measure the current and voltage at the one or more sensors 48, and compute the difference between an estimated current and an actual current to determine the motor back-emf voltage. The controller 62 may utilize the motor back-emf voltage to determine adjustments to the primary VFD 38 or the secondary VFD 60 that would adjust the rotor angle of the PMM 30 and drive the difference between the estimated current and the actual current toward zero, thereby increasing the stability of the PMM 30. Accordingly, the one or more sensors 48 may measure the response (e.g., motor inductance) from the ESP assembly 22 to determine the rotor angle of the PMM 30.

Figure 4:
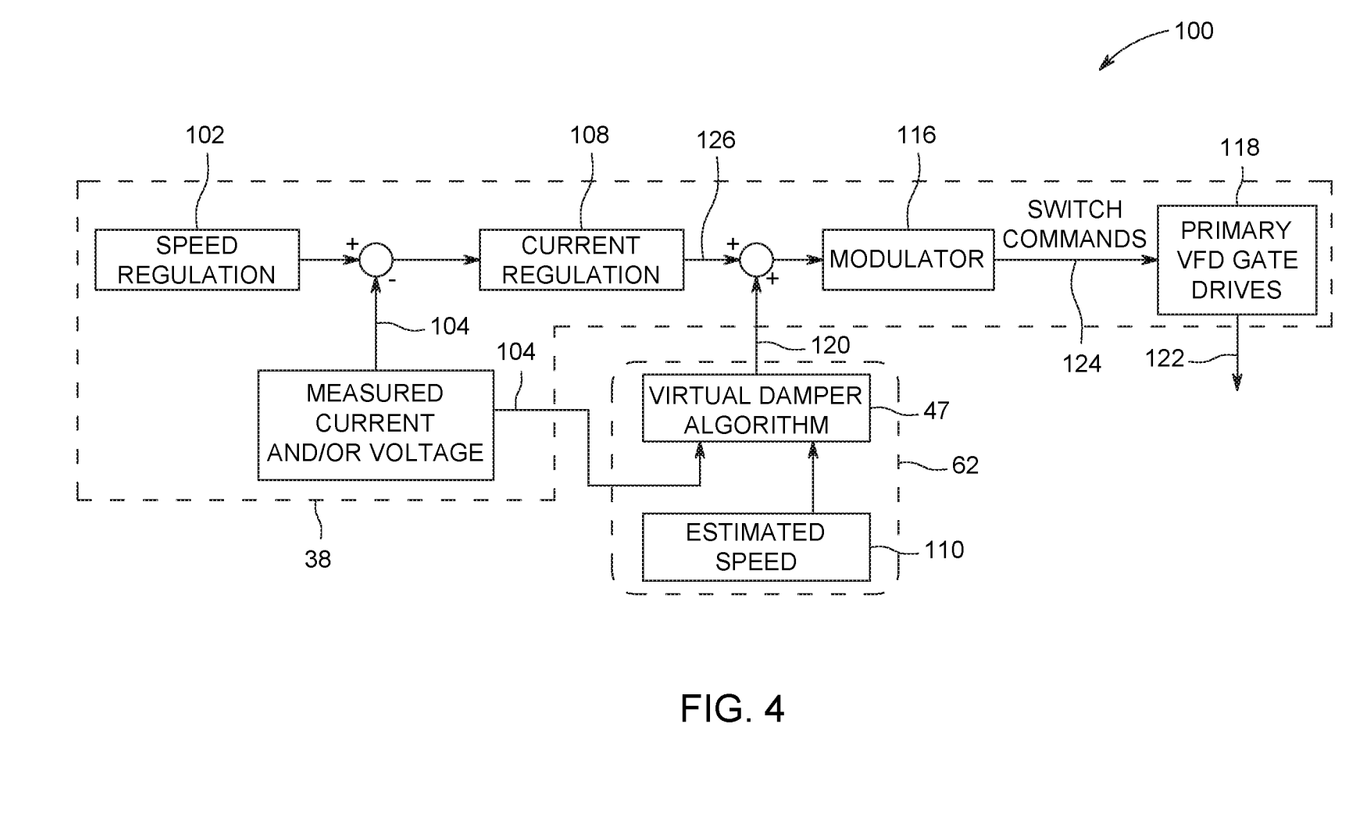
FIG. 4 is a flow chart for a process of determining adjustment commands for a main VFD of FIG. 1, with a virtual damping algorithm executed by a controller acting as the virtual encoder of FIG. 3.

FIG. 4 is a flow diagram 100 that illustrates an embodiment of a process for modifying the power output (e.g., voltage, current, frequency) from the primary VFD 38 during the transient event of the PMM 30. The process of the flow diagram 100 may be executed by the processor 64 of the controller 62 of the synchronization circuitry 44 described above. In the illustrated embodiment of an ESP control system where the controller 62 operates as a virtual encoder 90, the power output from the primary VFD 38 may be modulated based at least in part on an output from a virtual damping algorithm 47. The output from the virtual damping algorithm 47 may be a set of instructions (e.g., code) to be executed by the controller 62 to simulate on the power output the effects of a damper, such as a damper cage disposed on the PMM. The power output from the primary VFD 38 may be determined according to a first set of motor control objectives (e.g., desired speed, desired load), then modulated based at least in part on the output from the virtual damping algorithm 47 to compensate the power output during the transient event. In this manner, the virtual damping algorithm 47 may be configured to provide voltage modification information to the main VFD 38, in order to maintain or improve the synchronous relationship between the rotation of the shaft of the PMM 30 and the current supplied to the PMM 30.

The virtual damper algorithm 47 may be an algorithm executed by the controller 62, as described with respect to FIG. 3. In particular, the virtual damper algorithm 47 of the illustrated embodiment may be configured to receive one or more values associated with the current operating conditions or parameters of the PMM 30. For example, the virtual damper algorithm 47 may receive measured values 104 of the current and/or the voltage supplied to the PMM 30. The controller 62 may receive the measured values 104 from the one or more sensors of the ESP control system 36. Further, the controller 62 may be configured to estimate a speed 110 of the shaft of the PMM 30, such as a speed that representative of the desired speed for maintaining stability within the system 10. In some embodiments, the controller 62 receives the estimated speed 110 of the shaft of the PMM 30. Based at least in part on the measured values 104 and the estimated speed of the shaft of the PMM 30, the virtual damper algorithm 47 may determine a modulation command 120, as described below with FIG. 6.

Gate drives 118 of the primary VFD 38 generate the power output 122 for the PMM 30 to operate with a desired speed and desired torque based at least in part on switch commands 124 supplied to the gate drives 118. To generate the switch commands 124, a speed regulation 102 function may be added with the measured value 104 of the current and/or voltage 104 of the power output 122 provided to the PMM 30. The added speed regulation 102 and the measured value 104 are utilized by a current regulation function 108 to determine a regulated current command 126 for the PMM 30. The regulated current command 114 may be added with the modulation command 120 from the virtual damper algorithm 47 to compensate for the transient event, and the summed commands supplied to a modulator 116 to generate the switch commands 124. In some embodiments, the modulator 116 is the signal output module 98 of FIG. 3. Additionally, or in the alternative, the modulator 116 may be an algorithm executed by the processor 64 of the controller 62. During a steady-state operation of the PMM 30 when the speed of the PMM 30 and the load on the PMM 30 are steady (i.e., constant), the switch commands 124 from the modulator 116 may be substantially or wholly based on the regulated current command 126. That is, the modulation command 120 from the virtual damper algorithm 47 may be omitted or may be only a nominal command during steady-state operation of the PMM 30. Thus, the virtual damper algorithm 47 simulates a damper cage, which would have substantially no effect on the PMM during steady-state operation. In contrast, the modulation command 120 from the virtual damper algorithm 47 may significantly affect the switch commands 124 from the modulator 116 during a transient event of the PMM 30, such as during a sudden change in the load or speed of the PMM 30.

While many of the elements of the flow diagram 100 are shown to occur within the primary VFD 38, it may be appreciated that in some embodiments, the controller 62 may determine the regulated current commands 126, the switch commands 124, or any combination thereof. For example, the primary VFD 38 may have processing circuitry that determines the switch commands 124 for the gate drives 118. Additionally, or in the alternative, the controller 62 determines the switch commands 124 and supplies the switch commands 124 to the gate drives 118 of the primary VFD 38.

Figure 5:
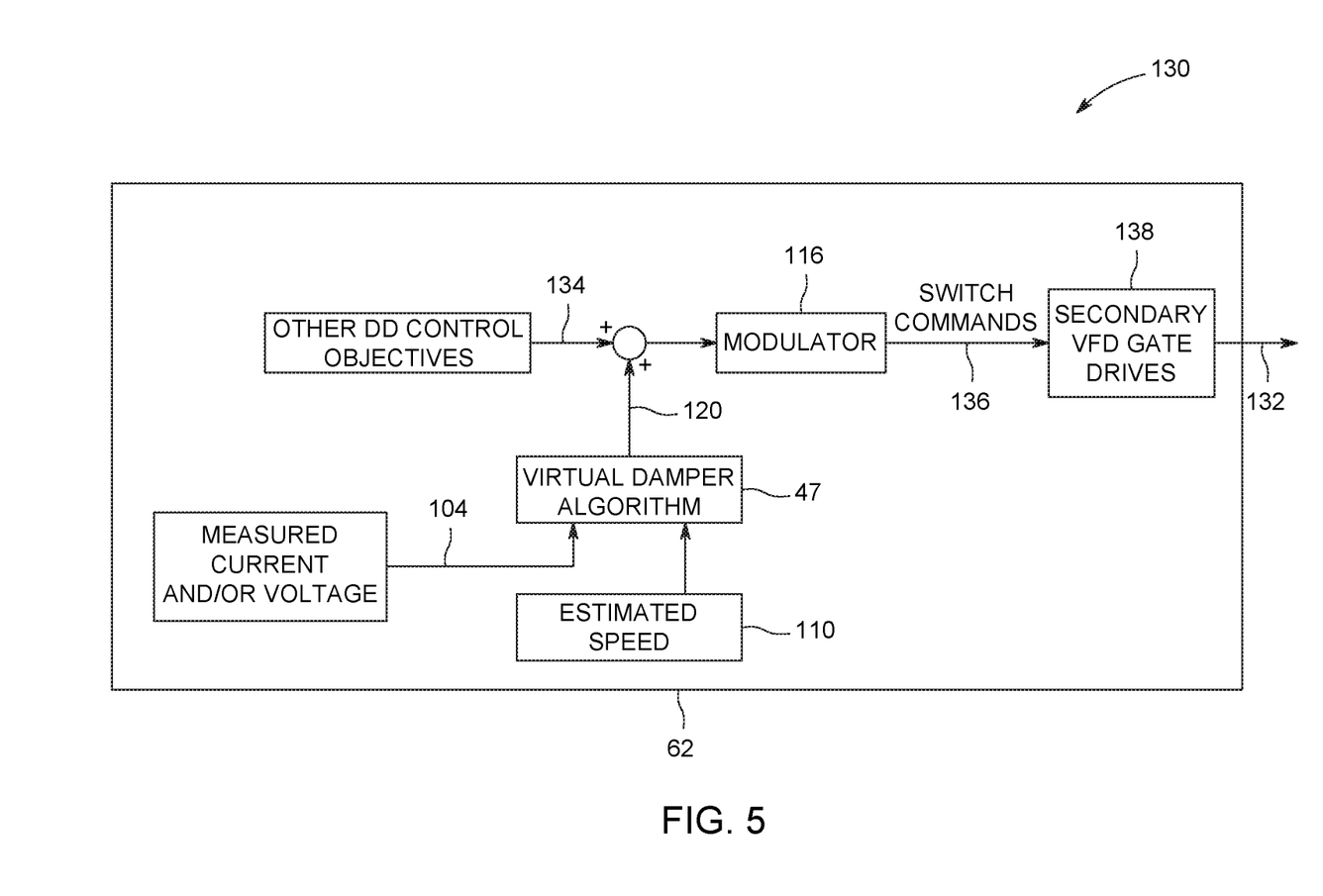
FIG. 5 is a flow diagram for a process of determining adjustment commands for a secondary VFD of FIG. 2, with virtual damping algorithm executed by a controller coupled to the secondary VFD of FIG. 2.

FIG. 5 is a flow diagram 130 that illustrates an embodiment of a process for modifying the power output during the transient event of the PMM 30 through supplementing the power output with a secondary power output 132 (e.g., voltage, current, frequency) from the secondary VFD 60. The process of the flow diagram 130 may be executed by the processor 64 of the controller 62 of the synchronization circuitry 44 described above. In the illustrated embodiment of an ESP control system is a dual drive system where the controller 62 controls the secondary VFD 60 to supplement the power output from the primary VFD 38. The controller 62 may utilize the process of the flow diagram 130 to supplement the power output from the primary VFD 38 based at least in part on the output from the virtual damping algorithm 47. The output from the virtual damping algorithm 47 may be a set of instructions (e.g., code) to be executed by the controller 62 during the transient event of the PMM 30 to simulate on the power output the effects of a damper, such as a damper cage disposed on the PMM. A base power output from the secondary VFD 60 may be determined according to a first set of motor control objectives (e.g., desired speed, desired load), then the base power output may be modulated to compensate for the transient event based at least in part on the output from the virtual damping algorithm 47. In this manner, the virtual damping algorithm 47 may be configured to provide voltage modification information to the secondary VFD 60, in order to maintain or improve the synchronous relationship between the rotation of the shaft of the PMM 30 and the current supplied to the PMM 30.

The virtual damper algorithm 47 of the controller 62 of the dual drive control system may generate the modulation command 120 based on the measured value 104 of the current and/or the voltage supplied to the PMM 30, and the estimated speed 110 of the shaft of the PMM 30. The power output from the secondary VFD 60 may be utilized for various control objectives unrelated to the transient event, such as to inject a high-frequency signal onto the power output for diagnostics, to improve the efficiency of the PMM, or to supplement the power output from the primary VFD 60, among others. The modulator 116 may generate switch commands 136 for the secondary gate drives 138 of the secondary VFD 60 based at least in part on commands 134 for one or more of those control objectives and the modulation command 120 from the virtual damping algorithm 47 for compensation during the transient event. In some embodiments, the modulator 116 is an algorithm executed by the processor 64 of the controller 62.

Figure 6:
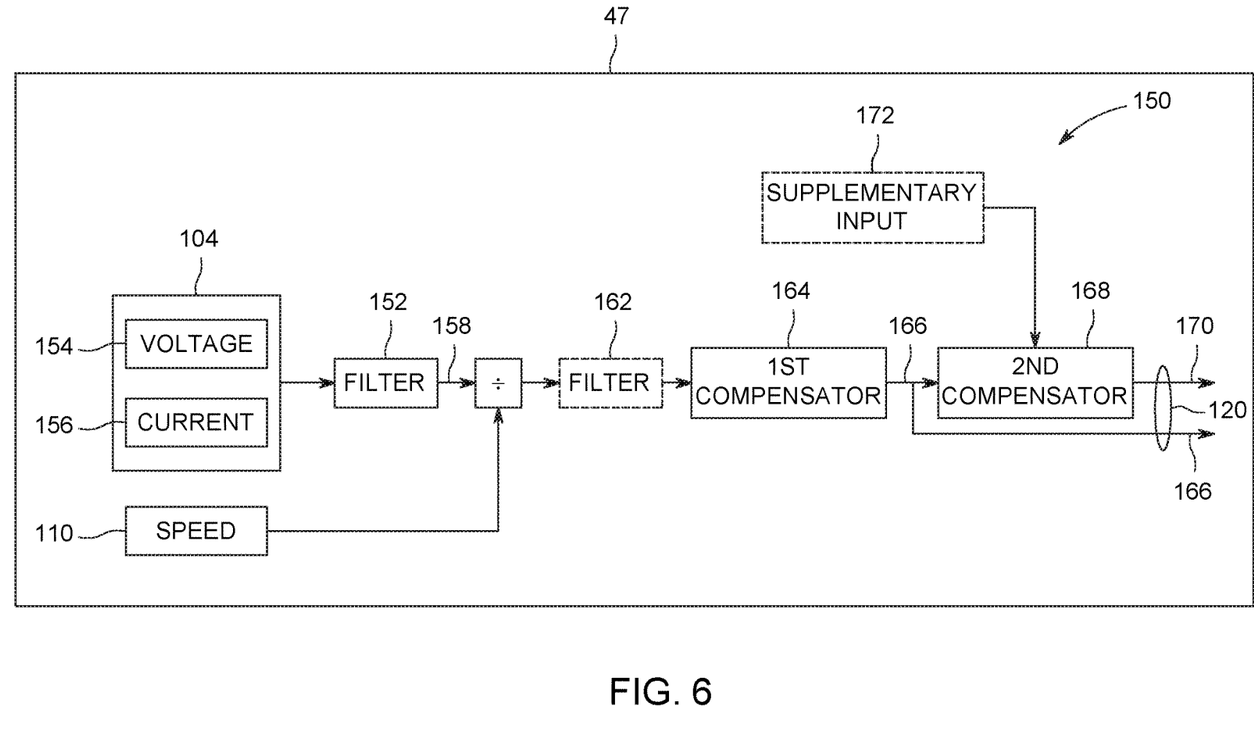
FIG. 6 is a flow diagram for a process implemented by the virtual damper algorithm of FIGS. 4 and 5 for determining the adjustment commands.

FIG. 6 illustrates a flow diagram 150 for the virtual damping algorithm 47 described above with FIGS. 3 and 4. Generally, the virtual damping algorithm 47 evaluates torque changes to determine instabilities of the PMM 30 and to compensate the power output to the PMM 30 for the instabilities during transient events in a similar manner as though the PMM 30 had a damper. The measured values 104 are received by a filter 152. In some embodiments, the measured values 104 are directly sensed power values. In some embodiments, the measured values 104 are directly sensed voltage values 154 and sensed current values 156, such that the power values may be determined indirectly by the product of the voltage values 154 and the current values 156. The filter 152 may be a high pass filter or a band pass filter that passes signals between 10 Hz and 1 kHz. The filter 152 may be a physical filter, or a software implemented filter. The threshold frequencies of the filter 152 may be selected based at least in part on preselected definitions of the transient event, such as a torque change over a threshold period or a speed change over a threshold period. The filter 152 may have a dynamically determined filter frequency to accommodate varying motor speeds during operation. The output of the filter 152 is a filtered power signal 158. It is believed that high-frequency torque changes on the shaft of the PMM correspond to events that precede the desynchronization of the PMM unless the power output to the PMM is adjusted appropriately.

The filtered power signal 158 is divided by the estimated speed 110 of the PMM 30 to determine a torque signal 160 representative of the torque on the shaft of the PMM 30. In some embodiments, the estimated speed 110 is a weighted average of a measured speed of the PMM 30 and a speed set point of the PMM 30. Optionally, the torque signal 160 may be filtered with a secondary filter 162. The secondary filter 162 may have a dynamically determined filter frequency to accommodate varying motor speeds during operation. The secondary filter 162 may be a high pass filter with a higher frequency than filter 152, or the secondary filter 162 may be a band pass filter with a narrower band than the filter 152. It may be appreciated that during steady-state operation of the PMM 30, there may be no high-frequency torque changes that would be identified by torque signals 160 that pass through the filters 152, 162. That is, the torque signals 160 may only pass through the filters 152, 162 during transient events.

The virtual damper algorithm 47 applies a first compensator 164 to the torque signal 160 (e.g., high-frequency torque change) to generate a first adjustment signal 166. The first compensator 164 may be one of various types of compensators that include, but is not limited to, a proportional controller, a PI controller, a PD controller, a PID controller, a lead controller, a lag controller, a lead/lag controller, or a nonlinear controller. As may be appreciated, the first compensator 164 may utilize a closed-loop feedback system where previous adjustment signals are utilized to determine future adjustment signals. The format of the first adjustment signal 166 may be based at least in part on the configuration of the modulator 116 that receives the adjustment command 120 described above. For example, the first adjustment signal 166 may be a voltage command, a frequency command, a position (e.g., angle) command, or a speed command, or any combination thereof. In some embodiments, the first adjustment signal 166 is the adjustment command 120 provided from the virtual damper algorithm 47 described above with FIGS. 3 and 4.

In some embodiments, a second compensator 168 may further process the first adjustment signal 166 to generate a second adjustment signal 170. The second compensator 168 may generate the second adjustment signal 170 based on a supplementary input 172 to the second compensator 168. The second compensator 168 may be one of various types of compensators that include, but is not limited to, a proportional controller, a PI controller, a PD controller, a PID controller, a lead controller, a lag controller, a lead/lag controller, or a nonlinear controller. In some embodiments, the second compensator 168 is a different type of compensator than the first compensator 164. The supplementary input 172 is an optional input for some embodiments, and may include a flux of the PMM 30, a cumulative operation time of the PMM 30, an environmental condition (e.g., temperature, pressure) of the PMM 30, or other parameters related to the operation of the PMM 30. The format of the second adjustment signal 170 may be based at least in part on the configuration of the modulator 116 that receives the adjustment command 120 described above. For example, the second adjustment signal 170 may be a voltage command, a frequency command, a position (e.g., angle) command, or a speed command, or any combination thereof.

In an embodiment, the first compensator 164 is a proportional compensator where the first adjustment signal 166 is a speed command, and the second compensator 168 is an integration compensator where the second adjustment signal 170 is a position command derived from the speed command. In another embodiment, the first compensator 164 is a proportional compensator where the first adjustment signal 166 is a speed command, and the second compensator 168 is a multiplication compensator that multiplies the first adjustment signal 166 (e.g., speed command) with a motor flux supplementary input 172 to generate a voltage adjustment command as the second adjustment signal 170. In some embodiments, the second adjustment signal 170 is the adjustment command 120 provided from the virtual damper algorithm 47 described above with FIGS. 3 and 4. In some embodiments, the first adjustment signal 166 and the second adjustment signal 170 together are the adjustment command 120 provided from the virtual damper algorithm 47. For example, the adjustment command 120 may include a speed command as the first adjustment signal 166 and a position command as the second adjustment signal 170. As described above with FIG. 3, the modulator 116 combines the adjustment command 120 from the virtual damper algorithm 47 for a virtual encoder ESP control system with the regulated current command 126 to generate switch commands 124 for the gate drives 118 of the primary VFD 38. As described above with FIG. 4, the modulator 116 combines the adjustment command 120 from the virtual damper algorithm 47 for a dual drive ESP control system with other commands 134 for the secondary VFD 60 to generate switch commands 136 for the secondary gate drives 138 of the secondary VFD 60.

The virtual damper algorithm 47 described herein may improve the efficiency and stability of the PMM 30 during torque pulsations that may otherwise affect the useful lifetime of components of the ESP assembly 22, such as the shaft of the PMM 30, bearings of the PMM 30, and seals of the PMM 30. Furthermore, the virtual damper algorithm 47 described herein may reduce or eliminate spikes in the current or voltage provided to the PMM that may otherwise have negative effects on the windings or permanent magnets of the PMM 30 the cable 46, or other components of the ESP control system 36. The virtual damper algorithm 47 may be implemented by the controller 62 of the ESP control system 36 without the addition of hardware to the ESP control system 36 or to the ESP assembly 22, such as a damper cage.

Technical effects of the disclosure include the use of a virtual damper algorithm for dual drive or virtual encoder embodiments of the ESP control system without additional elements to the ESP assembly. The adjustment command from the virtual damper algorithm provided by the controller may increase the operational stability of the permanent magnet motor (PMM) of the ESP assembly, particularly during transient operation where the load on the PMM changes rapidly. The increased stability of the PMM may reduce unscheduled down time of the ESP assembly of the hydrocarbon extraction system, thereby reducing operating costs. The improved stability of the PMM may increase the viability of the ESP assembly with a PMM, which may have a greater power density and efficiency than an induction motor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
a control system configured to control a first power output to an electric machine during a transient event, wherein the transient event is a torque change of the electric machine greater than a torque threshold over a threshold period or a speed change of the electric machine greater than a speed threshold over the threshold period, the control system comprising:
a controller configured to:
receive estimated speed input and measured values of the first power output provided to the electric machine during the transient event; and
determine adjustment commands to compensate the first power output for the transient event of the electric machine, wherein the adjustment commands are based on the estimated speed input and measured values of the first power output during the transient event; and
a modulator configured to generate switch commands for gate drives of a variable frequency drive (VFD) based at least in part on the adjustment commands, wherein the VFD is configured to modify the first power output during the transient event based on the switch commands.

2. The system of claim 1, comprising the VFD, and a virtual encoder configured to control the VFD, wherein the VFD is configured to generate a second power output to a transformer, and the transformer steps up a voltage of the second power output to generate the first power output.

3. The system of claim 1, comprising a secondary VFD configured to generate a third power output with the switch commands, wherein the secondary VFD is configured to modify the first power output with the third power output, and the secondary VFD is separate from the VFD.

4. The system of claim 1, wherein the controller is configured to determine a high-frequency torque change during the transient event based on the estimated speed input and the measured values of the first power output, and the adjustment commands are based on the determined high-frequency torque change.

5. The system of claim 4, wherein the controller comprises a first compensator configured to generate the adjustment commands based on the high-frequency torque change during the transient event, wherein the first compensator comprises a proportional compensator, an integral compensator, a derivative compensator, or any combination thereof.

6. The system of claim 5, wherein the controller comprises a second compensator configured to generate the adjustment commands based on a first compensator output from the first compensator, and wherein the adjustment commands comprise the first compensator output and a second compensator output from the second compensator.

7. The system of claim 6, wherein the second compensator is configured to generate the adjustment commands based on a magnetic flux of the electric machine and the first compensator output.

8. The system of claim 1, wherein the adjustment commands comprise a speed command, a position command, a voltage command, a frequency command, or a current command, or any combinations thereof.

9. The system of claim 1 comprising the electric machine, wherein the electric machine comprises a permanent magnet motor of an electric submersible pump (ESP).

10. A method comprising:
controlling, by a control system, a first power output to an electric machine during a transient event, comprising:
measuring values of the first power output provided to the electric machine during the transient event;
receiving, by a controller, an estimated speed input of the electric machine;
determining, by the controller, adjustment commands to compensate the first power output for the transient event of the electric machine, wherein the adjustment commands are based on the estimated speed input and measured values of the first power output during the transient event;
generating, by a modulator, switch commands for gate drives of a variable frequency drive (VFD) based at least in part on the adjustment commands; and
modifying, by the VFD, the first power output during the transient event based on the switch commands;
wherein the transient event is a torque change of the electric machine greater than a torque threshold over a threshold period or a speed change of the electric machine greater than a speed threshold over the threshold period.

11. The method of claim 10, wherein modifying the first power output during the transient event comprises directly controlling a second power output from the VFD to a transformer, and stepping up the voltage of the second power output to generate the first power output.

12. The method of claim 10, wherein modifying the first power output during the transient event comprises:
generating a third power output with a secondary VFD based on the switch commands, wherein the secondary VFD is separate from the VFD; and
modifying the first power output with the third power output.

13. The method of claim 10, comprising:
determining a high-frequency torque change during the transient event based on the estimated speed input and the measured values of the first power output, wherein the adjustment commands are based on the determined high-frequency torque change.

14. The method of claim 13, wherein determining the adjustment commands comprises supplying the determined high-frequency torque change to a first compensator configured to generate the adjustment commands, wherein the first compensator comprises a proportional compensator, an integral compensator, a derivative compensator, or any combination thereof.

15. The method of claim 14, wherein determining the adjustment commands comprises supplying a first compensator output from the first compensator to a second compensator, and generating the adjustment commands based on the first compensator output.

16. The method of claim 15, wherein the adjustment commands comprise the first compensator output and a second compensator output from the second compensator.

17. The method of claim 10, comprising filtering the measured values of the first power output provided to the electric machine with a high pass filter, a band pass filter, or any combination thereof.

18. The method of claim 10, wherein modifying the first power output during the transient event based on the switch commands is configured to stabilize the electric machine during the transient event, wherein the electric machine comprises a permanent magnet motor without a damper cage.

19. A control system comprising:
a primary variable frequency drive (VFD) configured to receive power from a power source and to output a variable voltage and variable amplitude AC signal to a transformer configured to output a stepped up AC signal to a permanent magnet motor; and
synchronization circuitry disposed between the transformer and the permanent magnet motor, wherein the synchronization circuitry is configured to receive the stepped up AC signal from the transformer, wherein the synchronization circuitry comprises:
one or more sensors configured to measure the current and the voltage of the stepped up AC signal; and
a controller coupled to the one or more sensors, wherein the controller is configured to:
determine a power of the stepped up AC signal from the measured current and the measured voltage during a transient event of the permanent magnet motor, wherein the transient event is a torque change of the electric machine greater than a torque threshold over a threshold period or a sped change of the electric machine greater than a speed threshold over the threshold period;
determine torque changes during the transient event from an estimated speed of the permanent magnet motor and the power of the stepped up AC signal;
determine adjustment commands to adjust the stepped up AC signal based at least in part on a first compensator output of a proportional compensator applied to the torque changes; and
control a supplemental AC signal from a secondary VFD based at least in part on the adjustment commands, wherein the supplemental AC signal is added to the stepped up AC signal and is configured to stabilize operation of the permanent magnet motor during the transient event.

20. The system of claim 19, wherein the controller is configured to determine adjustment commands to adjust the stepped up AC signal based at least in part on a second compensator output of a second compensator that is different from the proportional compensator, wherein the second compensator output is generated based at least in part on the first compensator output.

* * * * *